UNITED STATES PATENT OFFICE.

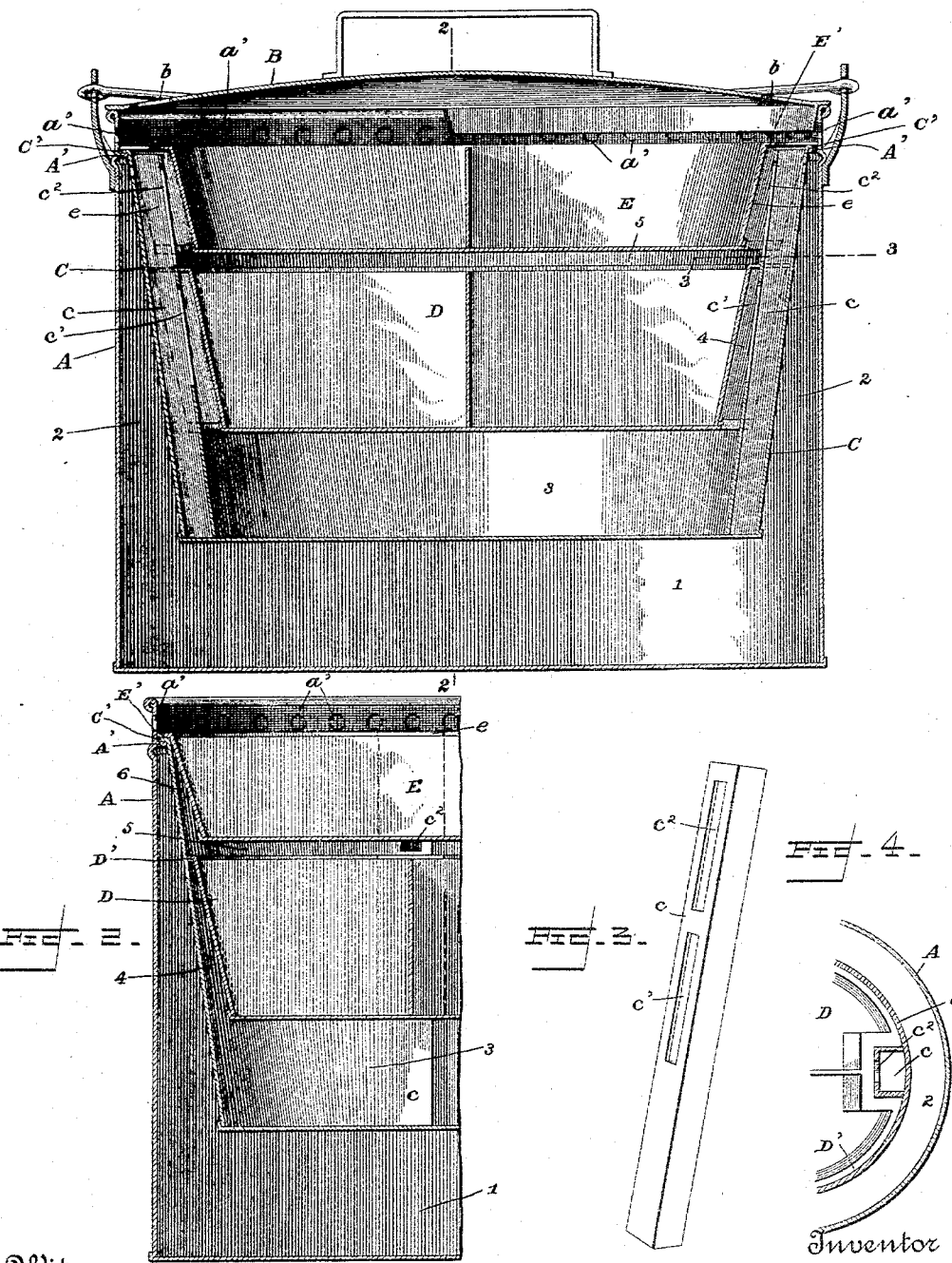

HARVEY HIBLER, OF PARIS, KENTUCKY.

DINNER-PAIL.

SPECIFICATION forming part of Letters Patent No. 533,808, dated February 5, 1895.

Application filed July 19, 1894. Serial No. 517,983. (No model.)

*To all whom it may concern:*

Be it known that I, HARVEY HIBLER, of Paris, in the county of Bourbon and State of Kentucky, have invented certain new and useful Improvements in Dinner-Pails; and I do hereby declare that the following is a full, clear, and exact description thereof, reference being had to the accompanying drawings, and to the letters and figures of reference marked thereon, which form part of this specification.

This invention is an improved dinner pail for workmen, and its object is to provide a compact carrier wherein the various kinds of eatables can be kept separate and in proper condition for consumption because of thorough ventilation. It is also useful as a steamer for cooking or warming food.

The invention therefore consists in the novel construction and combination of parts set forth in the claims, and more particularly described as follows, reference being had to the accompaning drawings by letters and figures of reference marked thereon.

Figure 1 is a central vertical longitudinal section through the pail with interior compartments in place. Fig. 2 is a detail transverse section on line 2—2, Fig. 1. Fig. 3 is a detail. Fig. 4 is a reduced detail transverse section on line 3—3, Fig. 1.

Referring to the drawings, A designates a vessel of any desired size provided with a bail attached thereto in an ordinary manner, and with a cover B provided with a vent opening or openings $b$, which may be covered with wire gauze to keep out insects.

Within the vessel, near the upper edge thereof, is an inwardly projecting flange A', and above this flange in the sides of the vessel is a vent opening or openings $a'$ which may be covered with wire gauze as shown, and which allow a free air circulation within the vessel when the cover is thereon. Within the vessel is a holder C smaller than the vessel, and having a top flange C' which rests on flange A' and suspends the holder therein as shown, leaving a space 1 between the bottoms of the holder and vessel, and a space 2 between the sides of holder and vessel, except where the flanges meet at top thereof.

On the sides of the holder are one or more ventilating tubes or channels $c$, which extend from bottom to top thereof, substantially as shown.

D is a pan divided into several compartments by partitions as shown, having a flange D' on its upper edge which is adapted to bind against the sides of the holder and thereby suspend the pan therein as shown in Fig. 1, or it can be otherwise suspended in the holder as shown, so as to leave an air space 3 between the bottom of pan D and holder, and an air space 4 around the sides thereof. Pan D has channels $d$ at points corresponding to the tubes $c$ of the holder, so that the pan can fit neatly in the holder as shown, and the air spaces 3 and 4 communicate with the tubes $c$ through openings $c'$ in the tubes as shown.

E is a pan similar to D, (excepting it may or may not have so many compartments) but slightly larger, having a top flange E' adapted to engage flange C' and suspend pan E within the holder above pan D, leaving an air space 5 between the bottom of pan E and top of pan D, and air space 6 around pan E. The pan E also has channels $e$ at points corresponding to tubes $c$, so that air spaces 5 and 6 can communicate with tubes $c$ through openings $c^2$ therein.

By means of the described vent openings, air spaces and air tubes air can circulate freely within and around the holder and pans so that articles of food therein will be thoroughly ventilated and the vapors arising therefrom will escape into the atmosphere instead of commingling and condensing upon the foods and spoiling them.

By placing water in the bottom of the vessel and boiling it the contents of the pans can be warmed, or steamed thoroughly.

I do not limit myself to the precise arrangement and construction of the ventilating air channels $c$ shown in the drawings as these can be modified and if desired for a cheaper, but less efficient holder, the vessel or holder might be dispensed with (*i. e.* the vessel becomes the pan, or the pan the vessel) as is obvious.

Having thus described my invention, what I claim as new, and desire to secure by Letters Patent thereon, is—

1. The combination of the holder provided with vertical ventilating air passages at its sides; with the independent pans suspended in said holder, one above and independent of the other, and respectively separated from the holder and from each other by air spaces which communicate with said ventilating passages, substantially as described.

2. The combination of the vessel, and the holder suspended therein provided with air conducting passages; with a pan suspended in said holder so as to be separated from the walls thereof by an air space, which communicates with the air passages, substantially as described.

3. The combination of the holder, provided with air tubes; the superimposed pans therein separated from each other and the holder by air spaces communicating with said tubes; said pans being channeled to fit around said tubes, substantially as described.

4. The combination of the vessel provided with an interior flange and ventilating openings above said flange; the holder suspended within the vessel on said flange provided with ventilating tubes; and the superimposed pans in said holder surrounded by air spaces communicating with said tubes and vent openings, substantially as described.

5. The herein described ventilated pail; consisting of the vessel A having flange A' and openings a', and cover B, with the holder D having flange C' and tubes c; and the superimposed pans E, D, having flanges E' D' and channels e, d, respectively, substantially as and for the purpose set forth.

In testimony that I claim the foregoing as my own I affix my signature in presence of two witnesses.

HARVEY HIBLER.

Witnesses:
E. J. MYALL,
C. F. DIDLAKE.